United States Patent
Noridomi

(10) Patent No.: US 9,928,404 B2
(45) Date of Patent: Mar. 27, 2018

(54) DETERMINATION DEVICE, DETERMINATION METHOD, AND NON-TRANSITORY STORAGE MEDIUM

(71) Applicant: Panasonic Intellectual Property Management Co., Ltd., Osaka (JP)

(72) Inventor: Shuzo Noridomi, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1 day.

(21) Appl. No.: 15/177,190

(22) Filed: Jun. 8, 2016

(65) Prior Publication Data

US 2017/0004354 A1  Jan. 5, 2017

(30) Foreign Application Priority Data

Jul. 3, 2015  (JP) .................................. 2015-134434

(51) Int. Cl.
| | | |
|---|---|---|
| *G06K 9/00* | (2006.01) | |
| *B60Q 9/00* | (2006.01) | |
| *G06K 9/62* | (2006.01) | |
| *G06T 7/73* | (2017.01) | |

(52) U.S. Cl.
CPC .......... *G06K 9/00255* (2013.01); *B60Q 9/00* (2013.01); *G06K 9/00248* (2013.01); *G06K 9/00845* (2013.01); *G06K 9/6262* (2013.01); *G06T 7/74* (2017.01); *G06K 9/00* (2013.01); *G06T 2207/20081* (2013.01); *G06T 2207/30201* (2013.01)

(58) Field of Classification Search
CPC .... G06K 9/00228; G06K 9/6292; G06K 9/72; G06K 9/00845; G06K 9/00248; G06K 9/00255; G06K 9/00604; G06K 9/00993; G06K 9/6262; G06K 9/00281; G06K 15/1878; G06K 9/00295; G06K 9/00335; G06K 9/4604; G06K 9/00973; G06K 9/00221; G06K 9/00234; G06K 9/4652;
(Continued)

(56) References Cited

U.S. PATENT DOCUMENTS

| | | | | |
|---|---|---|---|---|
| 6,504,942 B1 * | 1/2003 | Hong | ................. | G06K 9/00228 382/103 |
| 8,135,180 B2 * | 3/2012 | Baltatu | ................... | G06F 21/32 382/115 |

(Continued)

FOREIGN PATENT DOCUMENTS

JP    2011-134045    7/2011

*Primary Examiner* — Aklilu Woldemariam
(74) *Attorney, Agent, or Firm* — Greenblum & Bernstein, P.L.C.

(57) ABSTRACT

A determination device includes an receiver that receives a face image of a user from a camera whose direction of optical axis is predetermined with respect to a reference direction and a determiner that determines the face direction of the user depending on whether or not the reliability of a face direction calculated based on the face image and a learning model. The determiner determines the face direction depending on whether or not the reliability is greater than a first threshold value if the optical axis of the camera faces in a first direction and determines the face direction depending on whether or not the reliability is greater than a second threshold value different from the first threshold value if the optical axis faces in a second direction different from the first direction.

4 Claims, 10 Drawing Sheets

(58) Field of Classification Search
CPC ................. G06K 9/008; B60Q 9/00; G06T 2207/20081; G06T 2207/30201; G06T 7/74; G06T 11/00; G06T 11/001; G06T 19/20; G06T 15/50; G06F 3/044; G06F 2203/04101; G06F 3/041; G06F 3/0418; G06F 2203/0381; G06F 2203/04108; G06F 3/017; G06F 3/0304; G06F 3/03545; G06F 3/038; G06F 3/0416; G06F 3/0421; G06F 3/0425; G06F 3/042; G06F 21/32; G06F 21/34; G09B 21/009; H04N 5/23219; H04N 1/00336; H04N 1/32358; H04N 2101/00; H04N 2201/0084; H04N 5/232; H04N 5/23216; H04N 5/23293; G07C 9/00; G07C 9/00087; G07C 9/00103; H04L 63/0442; H04L 63/0823; H04L 63/0861; H04L 63/12; A45D 2044/007; A45D 44/005; A45D 44/00
USPC ....... 382/103, 118, 164, 165, 190, 203, 239, 382/291, 299; 713/186, 200, 358, 431, 713/591, 863
See application file for complete search history.

(56) References Cited

U.S. PATENT DOCUMENTS

| | | | | |
|---|---|---|---|---|
| 8,462,223 B2* | 6/2013 | Suzuki | ............... | G06K 9/00255 348/222.1 |
| 8,542,879 B1* | 9/2013 | Nechyba | ............ | G06K 9/00228 382/103 |
| 2004/0156535 A1* | 8/2004 | Goldberg | ............ | G03D 15/001 382/115 |
| 2006/0115157 A1* | 6/2006 | Mori | ................. | G06K 9/00221 382/190 |
| 2007/0195996 A1* | 8/2007 | Kitamura | ............ | G06K 9/00248 382/103 |
| 2008/0267459 A1* | 10/2008 | Nakada | ................ | G09B 19/00 382/118 |
| 2009/0059029 A1* | 3/2009 | Hoshii | ............... | G06K 9/00255 348/222.1 |
| 2009/0060384 A1* | 3/2009 | Hayaishi | ............ | G06K 9/00248 382/282 |
| 2009/0135269 A1* | 5/2009 | Nozaki | ............... | G06K 9/00221 348/222.1 |
| 2011/0158537 A1 | 6/2011 | Uno | | |
| 2012/0050769 A1* | 3/2012 | Houjou | ............. | G06K 9/00221 358/1.9 |
| 2013/0169827 A1* | 7/2013 | Santos | ............. | H04N 5/23229 348/207.1 |
| 2013/0271485 A1* | 10/2013 | Aoki | .................. | A45D 44/005 345/593 |
| 2014/0205157 A1* | 7/2014 | Suzuki | ............... | G06K 9/00362 382/118 |
| 2014/0247374 A1* | 9/2014 | Murakami | ......... | H04N 5/23219 348/222.1 |
| 2015/0154461 A1* | 6/2015 | Kitaura | ............. | G06K 9/00845 348/148 |
| 2015/0366328 A1* | 12/2015 | Tamura | ................. | A45D 44/00 434/100 |
| 2017/0169287 A1* | 6/2017 | Tokunaga | ......... | G06K 9/00288 |

\* cited by examiner

DETERMINATION DEVICE, DETERMINATION METHOD, AND NON-TRANSITORY STORAGE MEDIUM

BACKGROUND

1. Technical Field

The present disclosure relates to a determination device that determines the direction of a face, a determination method of determining the direction of a face, and a non-transitory storage medium on which a determination program is recorded.

2. Description of the Related Art

In recent years, attention has been given to a technique of estimating the direction of the face of a person based on an image taken by a camera. For example, a technique of estimating the direction of the face of a person watching the television, a person playing a computer game, or a person driving a vehicle or a train has been eagerly developed.

For example, known is a technique of the related art in which a plurality of detectors are used to determine the direction of a face (hereinafter referred to as the "face direction") of a person in an image of the face of the person (hereinafter referred to as a "face image"). The detectors have been allowed to learn in advance to detect the face of a person who is facing front (hereinafter referred to as a "frontal face") or the face of a person who is looking away (hereinafter referred to as a "profile"), in the face image (see, for example, Japanese Unexamined Patent Application Publication No. 2011-134045). In this technique of the related art, the face direction is determined based on the reliability of the detection results obtained by the plurality of face direction detectors each detecting a corresponding one of the frontal face, the profile, and the like.

SUMMARY

However, since the above-described technique of the related art determines that the face is oriented front based on an image of a frontal face which the face direction detector has been allowed to learn in advance, the degree of flexibility in the positional relationship between the direction of a frontal face of a person and a camera is low.

One non-limiting and exemplary embodiment provides a determination device, a determination method, and a determination program that can determine a face direction without causing a face direction detector to learn a face direction again even when the installation position of a camera is changed.

In one general aspect, the techniques disclosed here feature a determination device including: an receiver that receives a face image of a user from a camera whose direction of optical axis is predetermined with respect to a reference direction; and a determiner that determines the face direction of the user depending on whether or not the reliability of the face direction calculated based on the face image and a learning model. The determiner determines the face direction depending on whether or not the reliability is greater than a first threshold value if the optical axis of the camera faces in a first direction and determines the face direction depending on whether or not the reliability is greater than a second threshold value which is different from the first threshold value if the optical axis faces in a second direction which is different from the first direction.

According to an aspect of the present disclosure, it is possible to determine a face direction without causing a face direction detector to learn a face direction again even when the installation position of a camera is changed.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Underlying Knowledge Forming Basis of the Present Disclosure)

The above-described technique of the related art determines that the face is orientated front based on an image of a frontal face allowed to be learned in advance. As a result, there is no need to change an image allowed to be learned if the installation position of a camera is changed in a front-back direction with respect to the face of a person. However, it is necessary to cause the face direction detector to learn a face image again if the installation position of the camera is changed in a vertical or transverse direction with respect to the face of the person. Therefore, when the camera is used in a vehicle, if the camera is installed in the central part of the vehicle between a driver and a passenger, the positional relationship between a driver seat and an installation position differs depending on a vehicle. Accordingly, there is a need to cause the face direction detector to learn a face image for each vehicle. In the present disclosure, a determination device, a determination method, and a determination program that do not have to cause the face direction detector to learn a face image of a person for each vehicle even when the camera is installed in the central part of the vehicle will be described.

An embodiment of the present disclosure will be described with reference to the drawings.

Figure 1:
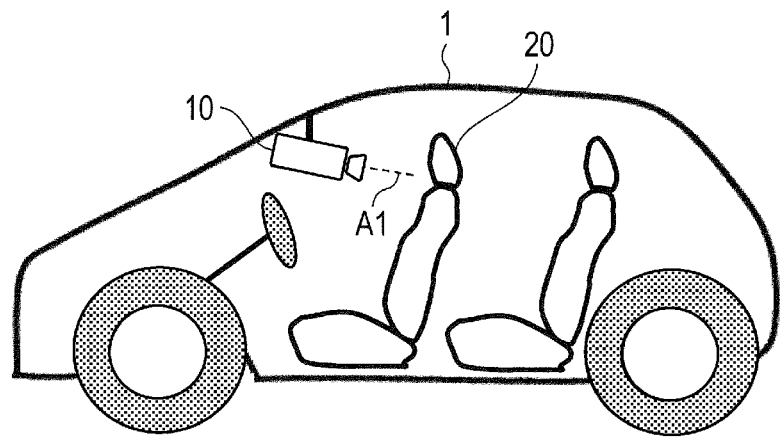
FIG. 1 is a side view depicting an example of the inside of a cabin of a vehicle according to an embodiment of the present disclosure.
Figure 2:
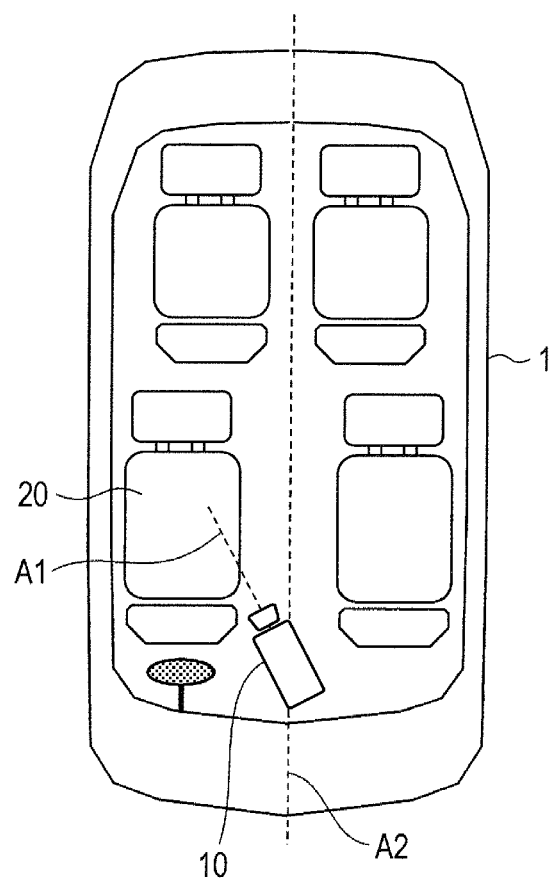
FIG. 2 is a top view depicting the example of the inside of the cabin of the vehicle according to the embodiment of the present disclosure.

First, the installation position of a camera 10 which is provided in a vehicle 1 according to this embodiment will be described by using FIGS. 1 and 2. FIG. 1 is a side view depicting an example of the inside of a cabin of the vehicle 1. FIG. 2 is a top view depicting the example of the inside of the cabin of the vehicle 1.

As depicted in FIGS. 1 and 2, the camera 10 is installed in a position anterior to a driver's seat 20 on the ceiling of the cabin of the vehicle 1. The camera 10 is installed in such a way that an optical axis A1 faces in a predetermined direction with respect to a reference direction (for example, a reference direction 302 depicted in FIG. 6). In FIGS. 1 and 2, for example, the camera 10 is installed in such a way that the optical axis A1 faces the driver's seat 20. As depicted in FIG. 2, the optical axis A1 of the camera 10 is inclined toward the driver's seat 20 with respect to an axis A2 in a vehicle-length direction and, as depicted in FIG. 1, is inclined downward. The vehicle 1 is, for example, an automobile.

Figure 3:
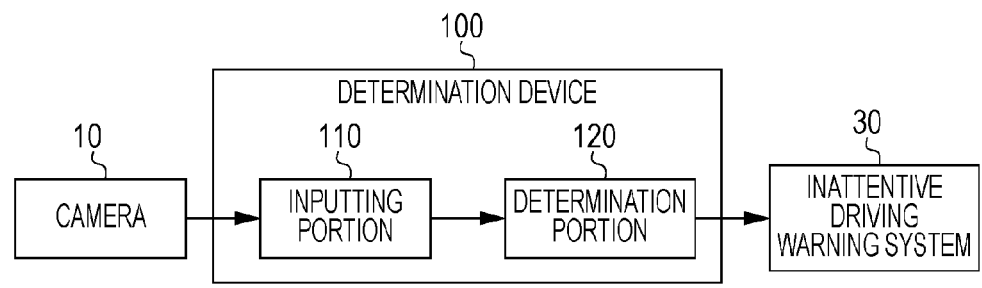
FIG. 3 is a block diagram depicting an example of the configuration of a determination device according to the embodiment of the present disclosure.

The camera 10 installed in the inside of the cabin in the above-described manner takes an image of the face of a driver sitting in the driver's seat 20 and outputs the face image to a determination device 100 (see FIG. 3). The determination device 100 is installed in a predetermined location in the vehicle 1 and is connected to the camera 10. The camera 10 and the determination device 100 may be connected through wire, by radio, or by using a combination of wire and radio.

Next, the configuration of the determination device 100 according to this embodiment will be described by using FIG. 3. FIG. 3 is a block diagram depicting an example of the configuration of the determination device 100.

The determination device 100 is a device that determines the face direction of the driver based on the face image taken by the camera 10. As depicted in FIG. 3, the determination device 100 includes an inputting portion (a receiver) 110 and a determination portion 120.

The inputting portion 110 receives the face image taken by the camera 10. As mentioned above, this face image is an image of the face of the driver (an example of the user) who is driving the vehicle 1.

The determination portion 120 calculates the reliability of the face direction based on a learning model obtained by learning the face direction of a person and the face image which the inputting portion (a receiver) 110 has received and determines the face direction depending on whether or not the reliability is greater than a predetermined threshold value.

For example, if the optical axis A1 of the camera 10 faces in a first direction, the determination portion 120 determines the face direction depending on whether or not the calculated reliability is greater than a first threshold value (for example, a threshold value 907 which will be described later); if the optical axis A1 of the camera 10 faces in a second direction which is different from the first direction, the determination portion 120 determines the face direction depending on whether or not the reliability is greater than a second threshold value (for example, a threshold value 909 which will be described later) which is different from the first threshold value.

Then, the determination portion 120 outputs information indicating the face direction determined thereby (hereinafter referred to as "face direction information") to an inattentive driving warning system 30.

In this embodiment, a description will be given by taking up a driver of an automobile as a person whose face direction is determined by the determination portion 120, but the person is not limited thereto. The person whose face direction is determined may be an occupant (a driver or a passenger) of a mobile unit (for example, a two-wheeler, a railway vehicle, or an aircraft) other than the automobile or may not be an occupant of the mobile unit. Thus, the determination device 100 may be installed in the mobile unit or installed in a fixed object (for example, a traffic light, a building, or a wall surface of a room).

The inattentive driving warning system 30 is a device that receives the face direction information from the determination portion 120 of the determination device 100, determines whether or not the driver is looking aside while driving based on the face direction information, and, if the driver is looking aside while driving, gives an alarm to that effect. The inattentive driving warning system 30 is formed of, for example, a control device, such as a processor, which determines inattentive driving, a memory device, such as memory, which stores information on the angle of a face direction at which a determination is made that the driver is looking aside while driving, a display device such as a display, and a sound output device such as a speaker.

The inattentive driving warning system 30 is installed in a predetermined location in the vehicle 1 and is connected to the determination device 100. The determination device 100 and the inattentive driving warning system 30 may be connected through wire, by radio, or by using a combination of wire and radio.

In this embodiment, it is assumed that the face direction information in the determination device 100 is output to the inattentive driving warning system 30, but an example is not limited thereto. The face direction information output from the determination device 100 may be used for processing other than warning of inattentive driving.

Figure 4:
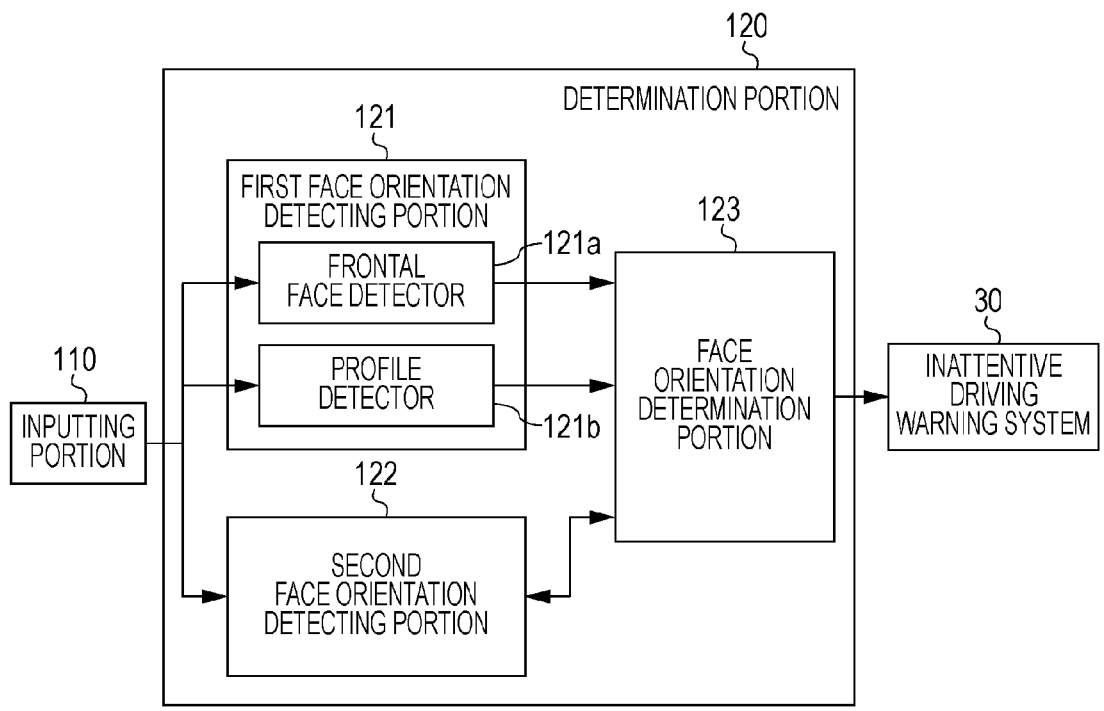
FIG. 4 is a diagram depicting an example of the configuration of a determination portion according to the embodiment of the present disclosure.
Figure 5:
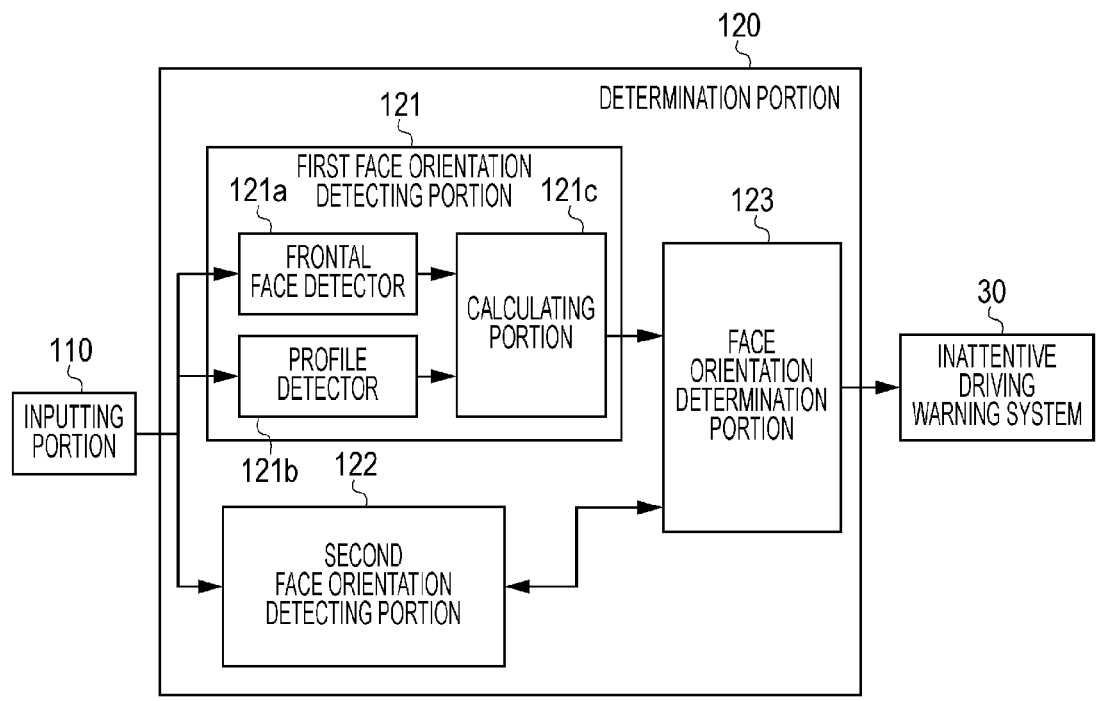
FIG. 5 is a diagram depicting an example of the configuration of the determination portion according to the embodiment of the present disclosure.

Next, the configuration of the determination portion 120 depicted in FIG. 3 will be described by using FIG. 4. FIG. 4 is a block diagram depicting an example of the configuration of the determination portion 120.

As depicted in FIG. 4, the determination portion 120 includes a first face direction detecting portion 121, a second face direction detecting portion 122, and a face direction determination portion 123. Hereinafter, each portion will be described.

First, the first face direction detecting portion 121 will be described. The first face direction detecting portion 121 has a frontal face detector 121a and a profile detector 121b and detects a frontal face or a profile in a face image by using these detectors.

The frontal face detector 121*a* detects a frontal face in the face image which the inputting portion 110 has received. The frontal face is a face in a position directly opposite to the camera 10.

The profile detector 121*b* detects a profile in the face image which the inputting portion 110 has received. The profile is a face facing the right or left with reference to the frontal face.

In the frontal face detector 121*a* and the profile detector 121*b*, learning is performed in advance in order to detect the frontal face and the profile, respectively. Here, the method of learning will be described.

First, a large number of face images are prepared. In general, it is desirable to prepare several tens of thousands or hundreds of thousands of face images of people who are different in terms of age, gender, race, and so forth in order to deal with face images of all types of people.

As the face images used for learning, there are a correct image and an incorrect image. The correct image is an image for causing the face direction detector to learn a correct answer, and the incorrect image is an image for causing the face direction detector to learn an incorrect answer. For example, when the frontal face detector 121*a* performs learning, a face image which is a taken image of a frontal face is used as a correct image and an image which is not a taken image of a frontal face is used as an incorrect image. Moreover, for example, when the profile detector 121*b* performs learning, a face image which is a taken image of a profile is used as a correct image and an image which is not a taken image of a profile is used as an incorrect image.

Next, by using the features extracted from the prepared correct images and incorrect images, the frontal face detector 121*a* and the profile detector 121*b* are each allowed to perform machine learning of correct answers and incorrect answers. As a method of extracting the features, from known techniques such as histograms of oriented gradients (HOG) which uses a histogram calculated from the brightness gradient in a face image as the features and Haar-Like which uses a difference in contrast between image regions as the features, an appropriate method is used in accordance with the characteristics in an image to be detected. The features is generally represented as a multidimensional characteristic vector.

Moreover, as the above-mentioned machine learning, known techniques such as support vector machine (SVM), neural networks (NN), and Boosting can be used. In the machine learning, based on, for example, the distribution of the features extracted from the prepared correct images and incorrect images, for example, a formula for computation of an evaluation value for detecting in which group, a group of the correct images or a group of the incorrect images, the features extracted from the face image which the inputting portion 110 has received is included is output to each of the frontal face detector 121*a* and the profile detector 121*b*.

The method of learning performed by each of the frontal face detector 121*a* and the profile detector 121*b* has been described.

Each of the frontal face detector 121*a* and the profile detector 121*b* which have performed the learning described above detects a frontal face or a profile in the face image based on the features extracted from the face image which the inputting portion 110 has received. For example, first, each of the frontal face detector 121*a* and the profile detector 121*b* calculates an evaluation value by using the formula for computation output at the time of machine learning based on the features extracted from the face image.

Next, each of the frontal face detector 121*a* and the profile detector 121*b* detects a frontal face or a profile in the face image based on the calculated evaluation value (a specific example thereof will be described later by using FIGS. 6 to 9A and 9B). Then, each of the frontal face detector 121*a* and the profile detector 121*b* calculates the reliability of the detected frontal face or profile and outputs reliability information indicating the reliability to the face direction determination portion 123.

As a method of calculating the reliability described above, there is a method by which the evaluation value is used directly as the reliability. For example, when the location of the face of a person in the face image is specified, the frontal face detector 121*a* extracts an image region in which the face of the person is present from the face image by using a window of a size corresponding to an estimated size of the face in the face image. Then, the frontal face detector 121*a* uses an evaluation value as it is as the reliability, the evaluation value being calculated based on the features extracted from the image region by using the formula for computation output by the machine learning.

Likewise, the profile detector 121*b* also extracts an image region by using the above-described window and uses an evaluation value directly as the reliability, the evaluation value being calculated based on the features extracted from the image region by using the formula for computation output by the machine learning.

On the other hand, there is a method of calculating the reliability in accordance with the number of detected frontal faces or profiles detected from a face image. For example, when the location of the face of a person in the face image is not specified, the frontal face detector 121*a* extracts a plurality of image regions in which a frontal face may be present by scanning the face image by using the above-described window and calculates, for each of the image regions, an evaluation value based on the extracted features by using the formula for computation output by the machine learning. Then, the frontal face detector 121*a* uses the number of image regions (in other words, the number of detected frontal faces) determined to include a frontal face based on the result of comparison between the evaluation value and a predetermined value as the reliability.

Likewise, the profile detector 121*b* also extracts a plurality of image regions in which a profile may be present by scanning the face image by using the above-described window and calculates, for each of the image regions, an evaluation value based on the extracted features by using the formula for computation output by the machine learning. Then, the profile detector 121*b* uses the number of image regions determined to include a profile based on the result of comparison between the evaluation value and a predetermined value as the reliability.

When the location of the face of a person in the face image is not specified, the average value of the evaluation values of all the image regions extracted by scanning of the face image, not the number of image regions determined to include a frontal face or a profile, may be used as the reliability. Then, a calculating portion 121*c* outputs reliability information indicating each calculated reliability to the face direction determination portion 123.

Here, a specific example of face direction detection processing which is performed by the frontal face detector 121*a* and the profile detector 121*b* will be described by using FIGS. 6 to 9A and 9B.

Figure 6:
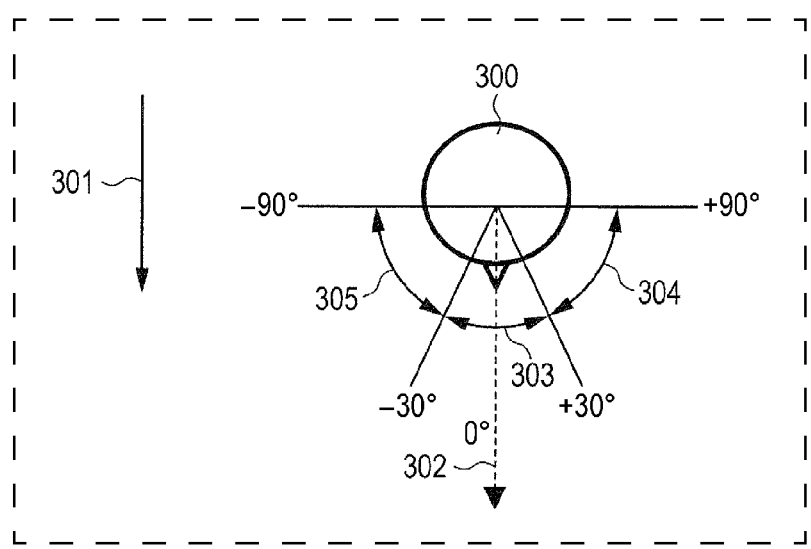
FIG. 6 is a diagram depicting an example of a detection range which is used in face direction detection processing according to the embodiment of the present disclosure.

First, by using FIG. 6, a detection range which is used in the face direction detection processing will be described. FIG. 6 is a diagram depicting an example of the detection range which is used in the face direction detection processing. FIG. 6 depicts a state in which the head of the driver is viewed from straight above.

In FIG. 6, the face of a driver 300 faces in a forward direction 301 of the vehicle 1. The face direction of the driver 300 at this time is referred to as a reference direction 302 and the angle of this direction is defined as 0 degree.

A detection range 303 is a −30 to +30 degree range with reference to the reference direction 302. A detection range 304 is a +30 to +90 degree range with reference to the reference direction 302. A detection range 305 is a −30 to −90 degree range with reference to the reference direction 302. The angle of the face direction in this embodiment is assumed to be an angle at which the head of the driver 300 rotates leftward (in an anticlockwise direction) or rightward (in a clockwise direction) about an axis (for example, an imaginary axis passing through the center of the head and extending in a vertical direction of the body of the driver 300 when the body of the driver 300 is viewed from straight above) in the vertical direction of the body of the driver 300 when the head of the driver 300 is viewed from straight above.

The frontal face detector 121a calculates an evaluation value based on the features extracted from a face image by using the formula for computation output by the machine learning. Then, the frontal face detector 121a detects whether the face image is a correct answer (includes a frontal face) or an incorrect answer (does not include a frontal face) based on the result of comparison between the evaluation value and a predetermined value. On the other hand, the profile detector 121b calculates an evaluation value based on the features extracted from the face image by using the formula for computation output by the machine learning. Then, the profile detector 121b detects whether the face image is a correct answer (includes a profile) or an incorrect answer (does not include a profile) based on the result of comparison between the evaluation value and a predetermined value.

Figure 7A:
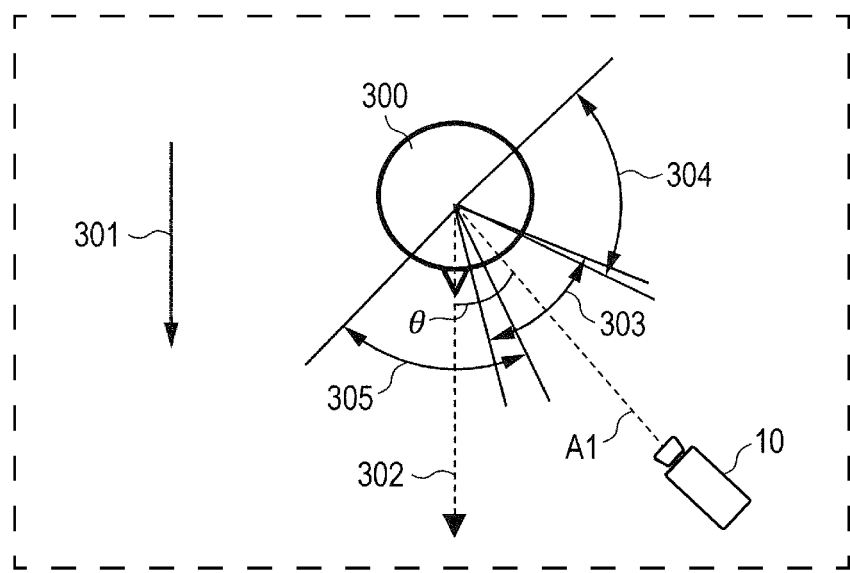
FIGS. 7A and 7B are diagrams, each explaining a first example of the face direction detection processing according to the embodiment of the present disclosure.
Figure 7B:
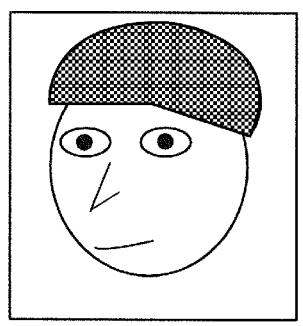

Next, by using FIGS. 7A and 7B, a first example of the face direction detection processing will be described. FIGS. 7A and 7B are diagrams, each explaining the first example of the face direction detection processing. FIG. 7A is a diagram depicting an example of the face direction of the driver and depicts a state in which the head of the driver is viewed from straight above. FIG. 7B is a diagram depicting an example of a face image taken by the camera 10 when the face direction is the face direction depicted in FIG. 7A. In FIG. 7A, the same elements as the elements of FIGS. 1 to 3 are denoted by the same reference characters.

In FIG. 7A, an angle θ is an angle formed by the optical axis A1 of the camera 10 and the reference direction 302 described in FIG. 3. That is, when the inside of the cabin of the vehicle 1 is viewed from straight above, the camera 10 is installed in such a way as to be displaced by the angle θ in an anticlockwise direction with reference to the reference direction 302.

As depicted in FIG. 7A, when the face direction of the driver 300 is the reference direction 302, a face image taken by the camera 10 is a face image of a profile (a right profile) depicted in FIG. 7B.

If the frontal face detector 121a receives the face image depicted in FIG. 7B from the inputting portion 110, the frontal face detector 121a detects that the face image is an incorrect answer (does not include a frontal face). On the other hand, if the profile detector 121b receives the face image depicted in FIG. 7B from the inputting portion 110, the profile detector 121b detects that the face image is a correct answer (includes a profile).

In FIG. 7A, when the face direction of the driver 300 is located in a portion where the detection range 303 and the detection range 304 or the detection range 305 overlap one another, both the frontal face detector 121a and the profile detector 121b determine that the face image is a correct answer, but the calculated reliability is low (the same applicable to the cases of FIGS. 8A and 9A which will be described later).

Next, by using FIGS. 8A and 8B, a second example of the face direction detection processing will be described. FIGS. 8A and 8B are diagrams, each explaining the second example of the face direction detection processing. FIG. 8A is a diagram depicting an example of the face direction of the driver and depicts a state in which the head of the driver is viewed from straight above. FIG. 8B is a diagram depicting an example of a face image taken by the camera 10 when the face direction is the face direction depicted in FIG. 8A. In FIG. 8A, the same elements as the elements of FIGS. 1 to 3 are denoted by the same reference characters. Moreover, the angle θ depicted in FIG. 8A is the same as the angle θ of FIG. 7A.

Figure 8A:
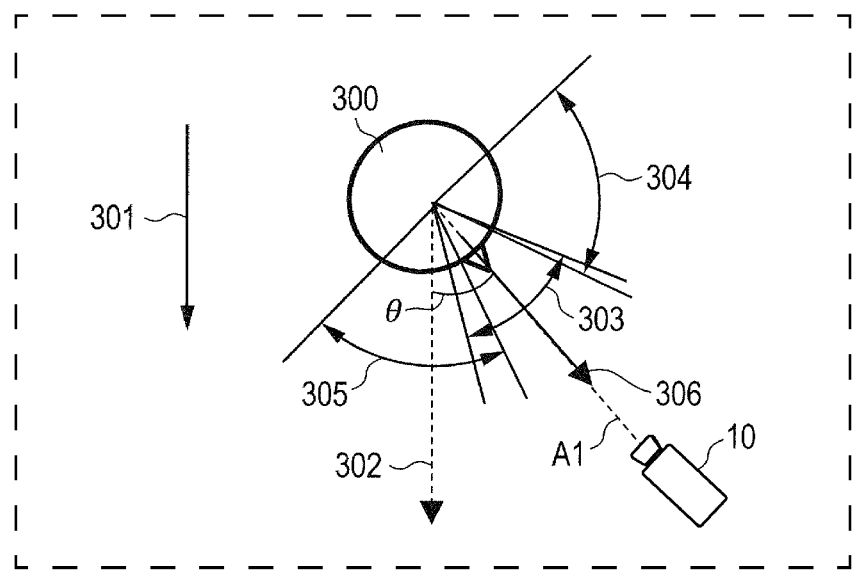
FIGS. 8A and 8B are diagrams, each explaining a second example of the face direction detection processing according to the embodiment of the present disclosure.
Figure 8B:
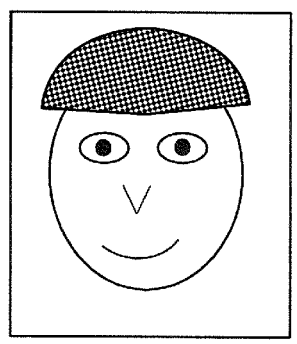

As depicted in FIG. 8A, when the face direction of the driver 300 is a face direction 306 which is the same as the direction of the optical axis A1 of the camera 10 (in other words, the face direction 306 in which the face of the driver 300 is in a position directly opposite to the camera 10), a face image taken by the camera 10 is a face image of a frontal face depicted in FIG. 8B.

If the frontal face detector 121a receives the face image depicted in FIG. 8B from the inputting portion 110, the frontal face detector 121a detects that the face image is a correct answer (includes a frontal face). On the other hand, if the profile detector 121b receives the face image depicted in FIG. 8B from the inputting portion 110, the profile detector 121b detects that the face image is an incorrect answer (does not include a profile).

Next, by using FIGS. 9A and 9B, a third example of the face direction detection processing will be described. FIGS. 9A and 9B are diagrams, each explaining the third example of the face direction detection processing. FIG. 9A is a diagram depicting an example of the face direction of the driver and depicts a state in which the head of the driver is viewed from straight above. FIG. 9B is a diagram depicting an example of a face image taken by the camera 10 when the face direction is the face direction depicted in FIG. 9A. In FIG. 9A, the same elements as the elements of FIGS. 1 to 3 are denoted by the same reference characters. Moreover, the angle θ depicted in FIG. 9A is the same as the angle θ of FIG. 7A.

Figure 9A:
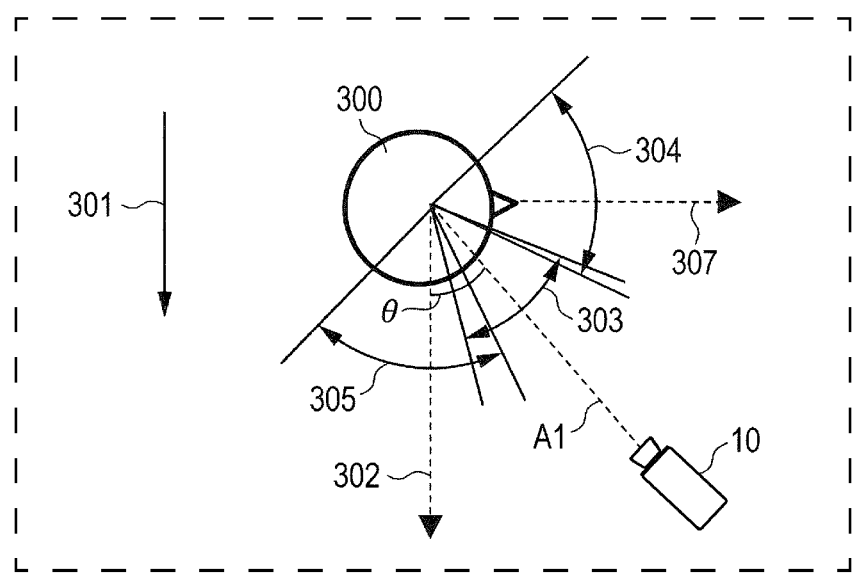
FIGS. 9A and 9B are diagrams, each explaining a third example of the face direction detection processing according to the embodiment of the present disclosure.
Figure 9B:
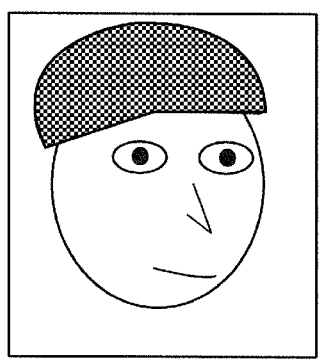

As depicted in FIG. 9A, when the face direction of the driver 300 is a face direction 307 of the face rotated in an anticlockwise direction with reference to the optical axis A1 of the camera 10, a face image taken by the camera 10 is a face image of a profile (a left-facing profile) depicted in FIG. 9B.

If the frontal face detector 121a receives the face image depicted in FIG. 9B from the inputting portion 110, the frontal face detector 121a detects that the face image is an incorrect answer (does not include a frontal face). On the other hand, if the profile detector 121b receives the face image depicted in FIG. 9B from the inputting portion 110, the profile detector 121b detects that the face image is a correct answer (includes a profile).

The first face direction detecting portion 121 has been described.

Next, the second face direction detecting portion 122 will be described. The following processing performed by the second face direction detecting portion 122 is performed when an instruction is given from the face direction determination portion 123 which will be described later.

The second face direction detecting portion 122 detects a face direction in a face image based on the positional relationships between parts such as eyes, a nose, and a mouth (hereinafter referred to as "face parts") in the face image which the inputting portion 110 has received. Specifically, the second face direction detecting portion 122 extracts characteristic points corresponding to the face parts from a face image and detects a face direction in the face image based on the positional relationships between the face parts indicated by the characteristic points (for example, the position of the midpoint between a right eye and a left eye and the positions of a nose and a mouth relative to eyes). For example, if the midpoint between a right eye and a left eye in a face image is located on a vertical median line of a facial surface, the second face direction detecting portion 122 detects an angle of 0° as a face direction. Moreover, if the midpoint between a right eye and a left eye in a face image is located in a position away from an area near a vertical median line of a facial surface as a result of, for example, the face of a person being turned from a state in which the face is in a position directly opposite to the camera 10, the second face direction detecting portion 122 detects an angle corresponding to the distance between the midpoint between the right eye and the left eye and the vertical median line of the facial surface as a face direction.

The second face direction detecting portion 122 outputs face direction angle information indicating the detected angle of the face direction to the face direction determination portion 123.

The second face direction detecting portion 122 has been described.

Next, the face direction determination portion 123 will be described.

The face direction determination portion 123 receives the reliability information from the first face direction detecting portion 121 and determines whether or not the reliability of the reliability information is greater than a threshold value (the details thereof will be described later).

If the reliability is greater than the threshold value, the face direction determination portion 123 determines the range of the angle of the face direction based on the reliability (the details thereof will be described later) and outputs information indicating the determination result (hereinafter referred to as "first face direction information") to the inattentive driving warning system 30.

On the other hand, if the reliability is smaller than or equal to the threshold value, the face direction determination portion 123 gives an instruction to the second face direction detecting portion 122 to detect a face direction. In response to this instruction, as described earlier, in the second face direction detecting portion 122, processing to detect a face direction based on the positional relationship between the face parts is performed. Then, the face direction determination portion 123 receives the face direction angle information from the second face direction detecting portion 122 and outputs the face direction angle information (hereinafter also referred to as "second face direction information") to the inattentive driving warning system 30.

The face direction determination portion 123 has been described.

Figure 10:
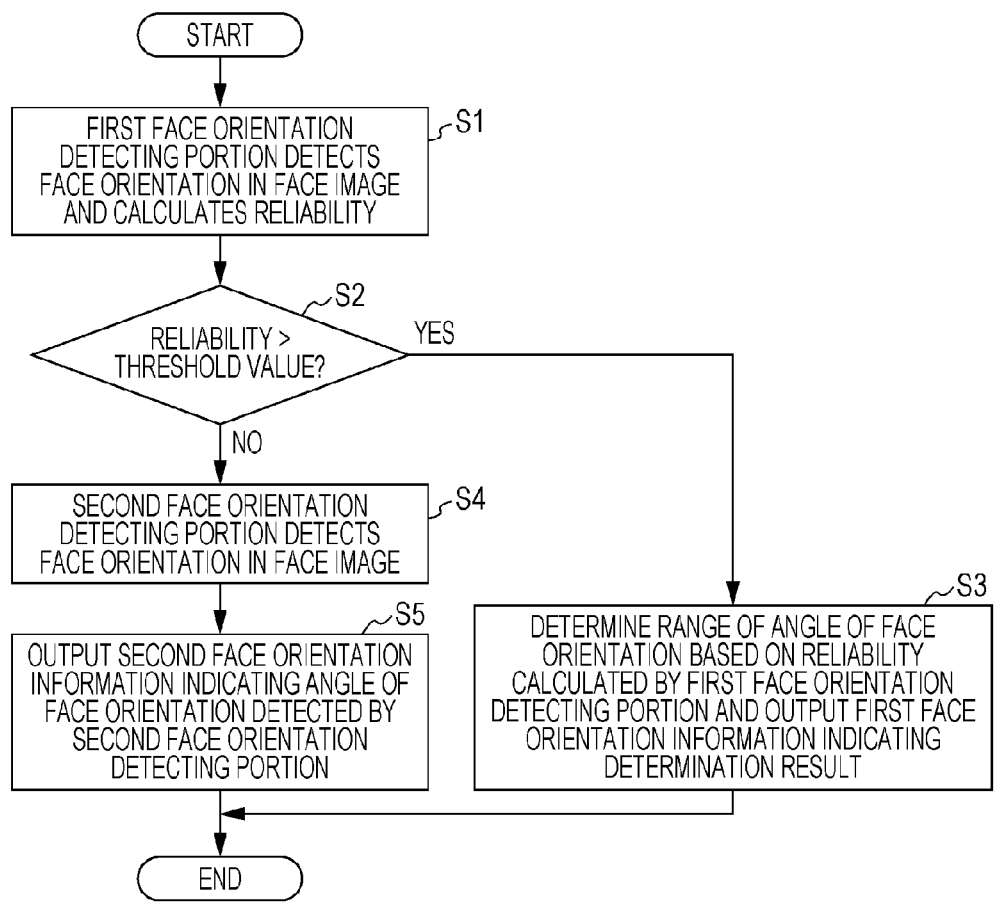
FIG. 10 is a flowchart of an example of the operation of the determination device according to the embodiment of the present disclosure.

Next, the operation of the determination device 100 according to this embodiment will be described by using FIG. 10. FIG. 10 is a flowchart of an example of the operation of the determination device 100.

First, the first face direction detecting portion 121 receives a face image (a face image of the driver 300 sitting in the driver's seat 20, the face image taken by the camera 10) from the inputting portion 110, detects a frontal face or a profile in the face image by using the frontal face detector 121a and the profile detector 121b, and calculates the reliability of the detected face direction (Step S1).

For example, if the face direction in the face image is the face direction 306 depicted in FIG. 8A, the frontal face detector 121a detects that the face direction is a frontal face (a correct answer) and calculates the reliability thereof and the profile detector 121b detects that the face direction is not a profile (an incorrect answer) and calculates the reliability thereof. In this case, as will be described later, the reliability calculated by the frontal face detector 121a is a value greater than the reliability calculated by the profile detector 121b.

Then, the first face direction detecting portion 121 outputs the reliability information indicating the reliability calculated by the frontal face detector 121a and the reliability information indicating the reliability calculated by the profile detector 121b to the face direction determination portion 123.

Next, the face direction determination portion 123 receives the above-described reliability information from the first face direction detecting portion 121 and determines whether or not the reliability included in each reliability information (for example, any one of the reliability calculated by the frontal face detector 121a and the reliability calculated by the profile detector 121b) is greater than a threshold value (Step S2). The threshold value will be described later.

As a result of the above determination, if the reliability is greater than the threshold value (Step S2: YES), the procedure proceeds to Step S3; if the reliability is smaller than or equal to the threshold value (Step S2: NO), the procedure proceeds to Step S4.

Figure 11:
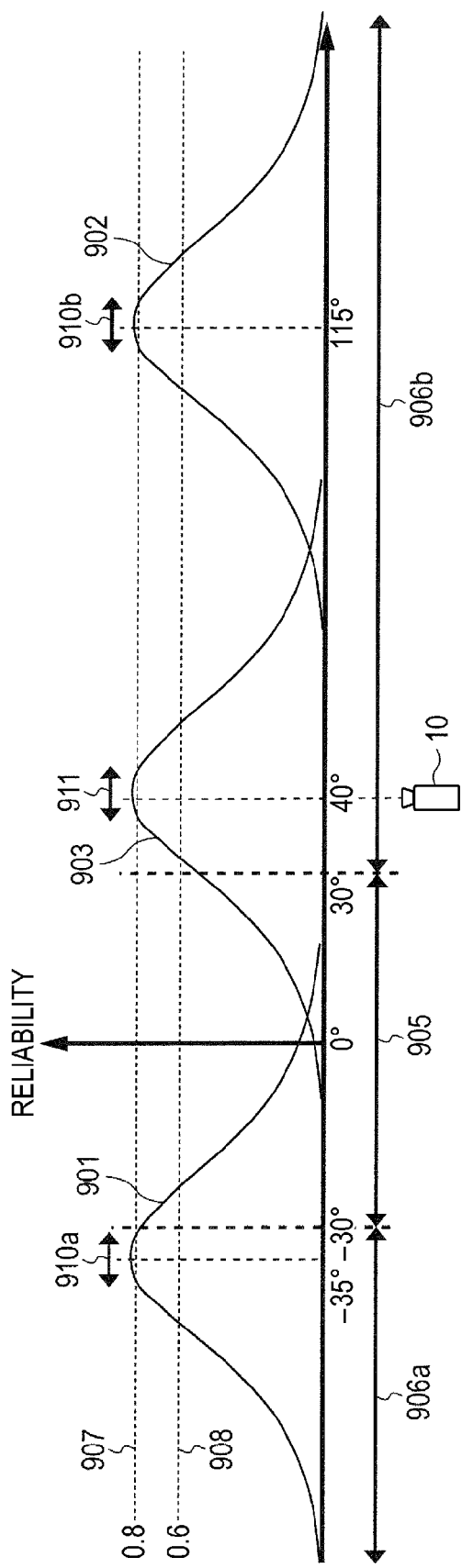
FIG. 11 is a diagram depicting an example of the relationship between the angle of a face direction and the reliability according to the embodiment of the present disclosure.

Here, an example of the relationship between the angle of a face direction and the reliability will be described by using FIG. 11. FIG. 11 is a diagram depicting an example of the relationship between the angle of a face direction and the reliability.

In FIG. 11, the horizontal axis represents the angle of a face direction and the vertical axis represents the reliability. Moreover, as described above by using FIG. 3, 0 degree on the horizontal axis of FIG. 11 is an angle (the angle of a reference direction) observed when the face direction of the driver 300 faces in the forward direction 301 of the vehicle 1. Furthermore, 40 degrees on the horizontal axis of FIG. 11 is the angle θ at which the camera 10 depicted in FIGS. 6 to 9A and 9B is installed.

Moreover, in FIG. 11, a determination range 905 is a −30 to +30 degree range and a range in which it is determined that the driver faces in the forward direction of the vehicle (the driver is not looking aside while driving). A determination range 906a is a range smaller than −30 degrees and a range in which it is determined that the driver does not face in the forward direction of the vehicle (the driver is looking aside while driving). A determination range 906b is a range greater than +30 degrees and a range in which it is determined that the driver does not face in the forward direction of the vehicle (the driver is looking aside while driving).

Furthermore, in FIG. 11, waveforms 901, 902, and 903 indicate the reliability of a face direction which is detected by the first face direction detecting portion 121. The waveform 901 indicates the reliability of a profile which is detected by the profile detector 121b as a correct answer when the face direction is in the detection range 305 depicted in FIG. 6 and other drawings. The waveform 902 indicates the reliability of a profile which is detected by the profile detector 121b as a correct answer when the face direction is in the detection range 304 depicted in FIG. 6 and other drawings. The waveform 903 indicates the reliability of a frontal face which is detected by the frontal face detector 121a as a correct answer when the face direction is in the detection range 303 depicted in FIG. 6 and other drawings.

The angles (−35, 115, and 40 degrees in FIG. 11) at which the waveforms 901, 902, and 903 depicted in FIG. 11 reach their respective peaks depend on the images used for learning performed by the frontal face detector 121a and the profile detector 121b as will be described later.

Moreover, in FIG. 11, a range 910a is a range in which the waveform 901 exceeds a threshold value 907. A range 910b is a range in which the waveform 902 exceeds the threshold value 907. A range 911 is a range in which the waveform 903 exceeds the threshold value 907. In other words, the range 910a, the range 910b, and the range 911 are the ranges of the angle of the face direction detected by the first face direction detecting portion 121 when the reliability calculated by the first face direction detecting portion 121 is greater than the threshold value 907.

The threshold value 907 is set based on the range of a face direction on which the inattentive driving warning system 30 desires to make a determination (for example, the determination range 905, the determination range 906a, and the determination range 906b) (the same applicable to a threshold value 908 and a threshold value 909 which will be described later). For example, the threshold value 907 is set such that the range 910a is included in the determination range 906a and the range 910b and the range 911 are included in the determination range 906b. However, the threshold value 907 is set such that each of the ranges 910a and 910b and the range 911 does not stretch over the determination range 906a and the determination range 905 and does not stretch over the determination range 906b and the determination range 905.

Examples of a person who sets the threshold value 907 include a manufacturer or a seller of the determination device 100, a manufacturer or a seller of the vehicle 1, and the user of the determination device 100 (for example, the driver of the vehicle 1) (the same applicable to the threshold value 908 and the threshold value 909 which will be described later).

In FIG. 11, two threshold values, the threshold value 907 and the threshold value 908, are depicted, but any one of the threshold value 907 and the threshold value 908 is used for determination of the reliability (see Step S2 of FIG. 10). First, a case where the threshold value 907 (an example of the first threshold value) is used will be described, and a case where the threshold value 908 is used will be described later.

For example, when a face image taken in a state in which the face of a person is in a position directly opposite to the camera 10 is used as a correct image when the frontal face detector 121a performs learning, since the camera 10 is installed in a 40 degree position, the frontal face detector 121a detects that a face image taken when the face direction is 40 degrees is a frontal face. As described earlier, in learning of frontal faces, based on, for example, the distribution of the features extracted from the prepared correct images (face images which include frontal faces) and incorrect images (face images which do not include frontal faces), a formula for computation of an evaluation value for determination in which group, a group of the correct images or a group of the incorrect images, the features extracted from the face image which the inputting portion 110 has received is included is output. That is, the formula for computation of an evaluation value depends on the correct images and the incorrect images which are used for learning. As the correct images, as described earlier, face images of many people who are different in terms of age, gender, race, and so forth, the people who are in variety, are prepared, but it is not possible for each person to be in a position directly opposite to the camera perfectly. Thus, images of faces inclined in front or behind or to the right or to the left or faces turned to the right or to the left are taken, but a face image in a state in which a person is in a position as directly opposite to the camera as possible is selected as a correct image. That is, in the correct images, the number of face images with face directions which are close to a state in which a person is in a position directly opposite to the camera is the largest, and the number of face images with face directions deviating from a state in which a person is in a position directly opposite to the camera is small. With the frontal face detector 121a which has learned these correct images, as the face direction is closer to a 40 degree direction which is the installation position of the camera 10, a frontal face is detected with a higher degree of reliability, and, as the face direction is away from 40 degrees, a frontal face is detected with a lower degree of reliability.

Also in learning which is performed by the profile detector 121b, face images of many people who face in a −35 degree or 115 degree direction and are different in terms of age, gender, race, and so forth, the people who are in variety, are prepared as correct images. With the profile detector 121b which has learned these correct images, as the face direction is closer to −35 degrees or 115 degrees, a profile is detected with a higher degree of reliability, and, as the face direction is away from −35 degrees or 115 degrees, a profile is detected with a lower degree of reliability.

The following is the continuation of the description of the flowchart of FIG. 10.

If the reliability is greater than the threshold value (Step S2: YES), the face direction determination portion 123 determines the angle of the face direction based on the reliability calculated by the first face direction detecting portion 121 and outputs the first face direction information indicating the determination result to the inattentive driving warning system 30 (Step S3).

For example, if 0.8 is set as the threshold value 907 as depicted in FIG. 11 and the reliability of the profile detected by the profile detector 121b of the first face direction detecting portion 121 is greater than 0.8, the profile is in the range 910a or the range 910b depicted in FIG. 11. The range 910a is always included in the determination range 906a in which a determination that the driver is looking aside while driving has to be made, and the range 910b is also always included in the determination range 906b in which a determination that the driver is looking aside while driving has to be made. Thus, the face direction determination portion 123 outputs the first face direction information indicating the range (the range smaller than −30 degrees in FIG. 11) of the angle of the determination range 906a or the range (the range greater than +30 degrees in FIG. 11) of the angle of the determination range 906b to the inattentive driving warning system 30.

Moreover, for example, as depicted in FIG. 11, if 0.8 is set as the threshold value 907 and the reliability of the frontal face detected by the frontal face detector 121a of the first face direction detecting portion 121 is greater than 0.8, the frontal face is in the range 911 depicted in FIG. 11. The range 911 is always included in the determination range 906b in which a determination that the driver is looking aside while driving has to be made. Thus, the face direction determination portion 123 outputs the first face direction information indicating the range (the range greater than +30 degrees in FIG. 11) of the angle of the determination range 906b to the inattentive driving warning system 30.

The inattentive driving warning system 30 determines that the driver is looking aside while driving based on the first face direction information received from the face direction determination portion 123 and gives an alarm to the driver by outputting a warning image, warning sound, or the like giving a warning to that effect.

If the reliability is smaller than or equal to the threshold value (Step S2: NO), the face direction determination portion 123 gives an instruction to the second face direction detecting portion 122 to detect a face direction. In response to this instruction, the second face direction detecting portion 122 performs processing to detect a face direction based on the above-described positional relationships between the face parts (Step S4). That is, the second face direction detecting portion 122 receives the face image from the inputting portion 110 and detects a face direction in the face image based on the positional relationships between the face parts such as eyes, a nose, and a mouth in the face image. Then, the second face direction detecting portion 122 outputs the face direction angle information indicating the angle of the detected face direction to the face direction determination portion 123.

The face direction determination portion 123 receives the face direction angle information from the second face direction detecting portion 122 and outputs the face direction angle information to the inattentive driving warning system 30 as the second face direction information (Step S5). If the angle of the face direction of the second face direction information is in the determination range 906a or the determination range 906b depicted in FIG. 11, the inattentive driving warning system 30 determines that the driver is looking aside while driving and gives an alarm to the driver by outputting a warning image, warning sound, or the like giving a warning to that effect.

An example of the operation of the determination device 100 has been described. As described above, if the reliability calculated by the first face direction detecting portion 121 is greater than the threshold value 907, the determination device 100 can preferentially adopt the detection result of the first face direction detecting portion 121 whose detection accuracy is higher than the detection accuracy of the second face direction detecting portion 122.

In the above description of the operation example, a case where the threshold value 907 (for example, 0.8) is used, for example, but, as depicted in FIG. 11, for example, the threshold value 908 (for example, 0.6) which is smaller than the threshold value 907 may be used. For example, as is the case with the threshold value 907, the threshold value 908 is set such that the range 910a is included in the determination range 906a and the range 910b and the range 911 are included in the determination range 906b. Moreover, the threshold value 908 is set such that each of the ranges 910a, 910b, and the range 911 does not stretch over the determination range 906a and the determination range 905 and does not stretch over the determination range 906b and the determination range 905.

When such a threshold value 908 is set, the face direction determination portion 123 makes a determination by using only the reliability calculated by the frontal face detector 121a. As depicted in FIG. 11, if the waveform 903 which is the reliability calculated by the frontal face detector 121a is greater than the threshold value 908, the range 911 of the face direction is always included in the determination range 906b in which a determination that the driver is looking aside while driving has to be made. The reason is as follows. If the waveform 902 which is the reliability calculated by the profile detector 121b is greater than the threshold value 908, the range 910b of the face direction is always included in the determination range 906b, but, if the waveform 901 which is the reliability calculated by the profile detector 121b is greater than the threshold value 908, the range 910a of the face direction is not always included in the determination range 906a.

Figure 12:
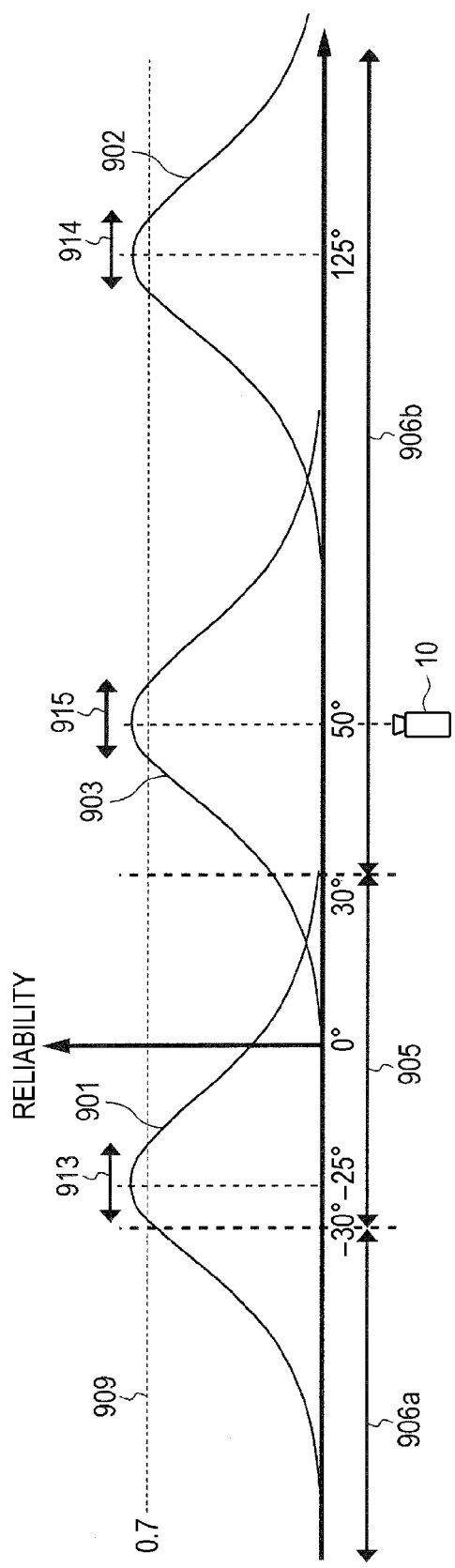
FIG. 12 is a diagram depicting an example of the relationship between the angle of a face direction and the reliability according to the embodiment of the present disclosure.

Next, a case where the installation position of the camera 10 depicted in FIGS. 7A to 9B is changed from a position in which θ=40 degrees to a position in which θ=50 degrees will be described by using FIG. 12. FIG. 12 is a diagram depicting an example of the relationship between the angle of a face direction and the reliability as in the case of FIG. 11. In FIG. 12, the same elements as the elements of FIG. 11 are denoted by the same reference characters.

When the installation position of the camera 10 is changed from 40 degrees to 50 degrees, as depicted in FIG. 12, waveforms 901, 902, and 903 of the reliability are displaced rightward by 10 degrees in the drawing from the positions depicted in FIG. 11. The shapes, magnitudes, and so forth of the waveforms 901 to 903 depicted in FIG. 12 are the same as the shapes, magnitudes, and so forth of the waveforms 901 to 903 depicted in FIG. 11.

Moreover, in FIG. 12, a range 913 is a range in which the waveform 901 exceeds the threshold value 909. A range 914 is a range in which the waveform 902 exceeds the threshold value 909. A range 915 is a range in which the waveform 903 exceeds the threshold value 909. In other words, the ranges 913 to 915 are the ranges of the angle of the face direction detected by the first face direction detecting portion 121 when the reliability calculated by the first face direction detecting portion 121 exceeds the threshold value 909.

Furthermore, as depicted in FIG. 12, the threshold value 909 (for example, 0.7; an example of the second threshold value) is set. When the installation position of the camera 10 is changed from 40 degrees to 50 degrees, the threshold value 909 is set such that, for example, the range 913 is included in the determination range 905 and the range 914 and the range 915 are included in the determination range 906b. Moreover, the threshold value 909 is set such that each of the ranges 913 to 915 does not stretch over the determination range 906a and the determination range 905 and does not stretch over the determination range 906b and the determination range 905.

An example of the operation of the determination device 100 in such a case will be described. In this operation example, since the operations of the inputting portion 110, the first face direction detecting portion 121, the second face direction detecting portion 122, and so forth are the same as those described above, the explanations thereof are omitted. Hereinafter, an example of the operation of the face direction determination portion 123 will be mainly described.

When the face direction determination portion 123 receives the reliability information from the first face direction detecting portion 121, the face direction determination portion 123 determines whether or not any one of the waveforms 901 to 903 which is the reliability of the reliability information is greater than the threshold value 909.

As a result of the above determination, if all the waveforms 901 to 903 are smaller than or equal to the threshold value 909, the face direction determination portion 123 gives an instruction to the second face direction detecting portion 122 to perform the face direction detection processing. Since the following operation is the same as that described above, the explanation thereof is omitted.

As a result of the above determination, if any one of the waveforms 901 to 903 is greater than the threshold value 909, the face direction determination portion 123 specifies the one of the range 913 to 915 that exceeds the threshold value 909.

Next, the face direction determination portion 123 specifies any one of the determination ranges 905, 906a, and 906b including the specified one of the ranges 913 to 915 and outputs the first face direction information indicating the angle of the specified range (in other words, the range of the angle of the face direction) to the inattentive driving warning system 30.

For example, as depicted in FIG. 12, if the waveform 903 which is the reliability calculated by the frontal face detector 121a is greater than the threshold value 909, the face direction is in the range 915 and is always included in the determination range 906b in which a determination that the driver is looking aside while driving has to be made. Thus, the face direction determination portion 123 outputs the first face direction information indicating the range (the range greater than +30 degrees in FIG. 12) of the angle of the determination range 906b to the inattentive driving warning system 30. As described earlier, the inattentive driving warning system 30 gives an alarm to the effect that the driver is looking aside while driving based on the first face direction information.

Moreover, for example, as depicted in FIG. 12, when the profile detector 121b has learned a face image of a left profile (for example, a profile facing in a 125 degree direction as a result of a face being turned 75 degrees from the position in which the face is in a position directly opposite to the camera 10) as a correct image and the waveform 902 which is the reliability calculated by the profile detector 121b is greater than the threshold value 909, the face direction is in the range 914 and is always included in the determination range 906b in which a determination that the driver is looking aside while driving has to be made. Thus, the face direction determination portion 123 outputs the first face direction information indicating the range (the range greater than +30 degrees in FIG. 12) of the angle of the determination range 906b to the inattentive driving warning system 30. As described earlier, the inattentive driving warning system 30 gives an alarm to the effect that the driver is looking aside while driving based on the first face direction information.

Furthermore, for example, as depicted in FIG. 12, when the profile detector 121b has learned a face image of a right profile (for example, a profile facing in a −25 degree direction as a result of a face being turned −75 degrees from the position in which the face is in a position directly opposite to the camera 10) as a correct image and the waveform 901 which is the reliability calculated by the profile detector 121b is greater than the threshold value 909, the face direction is in the range 913 and is always included in the determination range 905 in which a determination that the driver is not looking aside while driving has to be made. Thus, the face direction determination portion 123 outputs the first face direction information indicating the range (the −30 to +30 degree range in FIG. 12) of the angle of the determination range 906a to the inattentive driving warning system 30. The inattentive driving warning system 30 determines that the driver is not looking aside while driving based on the first face direction information. In this case, the inattentive driving warning system 30 does not give an alarm.

As described above, with the determination device 100 of this embodiment, if the reliability calculated by the first face direction detecting portion 121 is greater than the threshold value, the information on the face direction detected by the first face direction detecting portion 121 (the first face direction information) is output; if the reliability calculated by the first face direction detecting portion 121 is smaller than or equal to the threshold value, the information on the face direction detected by the second face direction detecting portion 122 (the second face direction information) is output. As a result, even when the installation position of the camera 10 is changed, it is possible to determine a face direction without causing the frontal face detector 121a and the profile detector 121b to learn a face direction again.

The embodiment of the present disclosure has been described in detail with reference to the drawings, and the functions of the parts of the determination portion 120 of the above-described determination device 100 can be implemented by a computer program.

Figure 13:
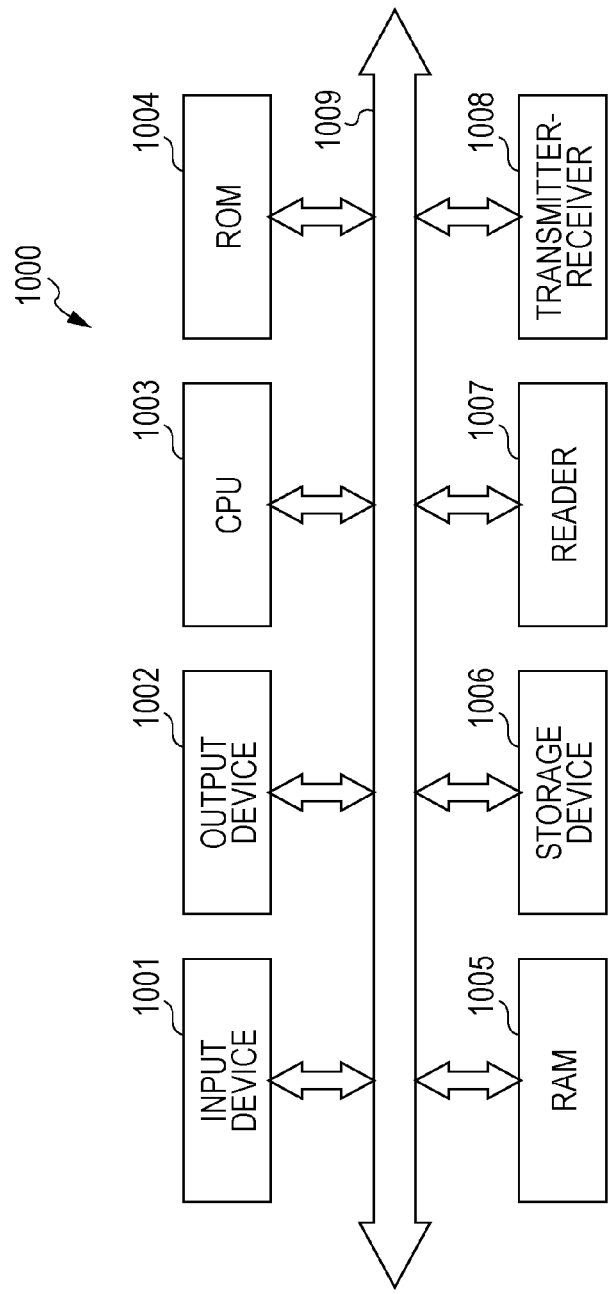
FIG. 13 is a block diagram depicting a hardware configuration example of the determination device according to the embodiment of the present disclosure.

FIG. 13 is a diagram depicting the hardware configuration of a computer that implements the functions of the parts by a program. A computer 1000 includes an input device 1001 such as an input button or a touch pad, an output device 1002 such as a display or a speaker, a central processing unit (CPU) 1003, read-only memory (ROM) 1004, random access memory (RAM) 1005, and a storage device 1006 such as a hard disk device or a solid state drive (SSD). Moreover, the computer 1000 includes a reader 1007 that reads information from storage media such as digital versatile disk read-only memory (DVD-ROM) and universal serial bus (USB) memory and a transmitter-receiver 1008 that performs communication via a network. The parts depicted in FIG. 13 are connected to one another by a bus 1009.

In addition, the reader 1007 reads a program for implementing the functions of the parts described above from a storage medium on which the program is recorded and causes the storage device 1006 to store the program. Alternatively, the transmitter-receiver 1008 performs communication with a server device connected to the network and causes the storage device 1006 to store a program for implementing the functions of the parts described above, the program being downloaded from the server device.

Then, as a result of the CPU 1003 copying the program stored in the storage device 1006 to the RAM 1005 and sequentially reading instructions included in the program from the RAM 1005 and executing the instructions, the functions of the parts described above are implemented. Moreover, when the program is executed, the information obtained by the various processing described in the embodiment is stored in the RAM 1005 or the storage device 1006 and is used as appropriate.

The present disclosure is useful for a determination device that determines the direction of a face, a determination method of determining the direction of a face, a storage medium on which a determination program is recorded, and so forth.

What is claimed is:
1. A determination device comprising:
a receiver, which in operation receives a face image of a user from a camera whose direction of optical axis is predetermined with respect to a reference direction, the reference direction being defined as a reference direction of a face of the user;

a face direction detector, which in operation:
  detects a frontal face of the face image and determines a reliability of the detected frontal face,
  detects a profile in the face image, and
  determines a reliability of the detected profile; and
a determiner, which in operation determines the face direction depending on whether or not a reliability of a face direction based on the reliability of the detected frontal face and the reliability of the detected profile is greater than a first threshold value if the optical axis of the camera faces in a first direction, and determines the face direction depending on whether or not the reliability of the face detection is greater than a second threshold value which is different from the first threshold value if the optical axis faces in a second direction which is different from the first direction, and outputting information for the determined face direction, wherein at least one of the receiver and the determiner is included in a processor, wherein:
  the first threshold value is set such that a range of an angle of a face direction of the face image when the reliability of the face detection is greater than the first threshold value does not stretch over a first determination range which is a range of a predetermined angle with reference to the reference direction and a second determination range which is a range of a predetermined angle and is different from the first determination range, and
  the second threshold value is set such that a range of an angle of a face direction of the face image when the reliability of the face detection is greater than the second threshold value does not stretch over a third determination range which is a range of a predetermined angle with reference to the reference direction and a fourth determination range which is a range of a predetermined angle and is different from the third determination range.

2. The determination device according to claim 1, wherein the determiner determines the face direction based on a positional relationship of face parts in the face image if the reliability of the face detection is not greater than the first threshold value or the second threshold value.

3. A determination method comprising:
  receiving a face image of a user from a camera whose direction of optical axis is predetermined with respect to a reference direction, the reference direction being defined as a reference direction of a face of the user;
  detecting a frontal face of the face image and determining a reliability of the detected frontal face;
  detecting a profile in the face image;
  determining a reliability of the detected profile;
  calculating a reliability of a face direction based on the reliability of the detected frontal face and the reliability of the detected profile;
  determining the face direction depending on whether or not the reliability of the face direction is greater than a first threshold value if the optical axis of the camera faces in a first direction;
  determining the face direction depending on whether or not the reliability of the face direction is greater than a second threshold value which is different from the first threshold value if the optical axis faces in a second direction which is different from the first direction; and
  outputting information for the determined face direction, wherein:
  the first threshold value is set such that a range of an angle of a face direction of the face image when the reliability of the face detection is greater than the first threshold value does not stretch over a first determination range which is a range of a predetermined angle with reference to the reference direction and a second determination range which is a range of a predetermined angle and is different from the first determination range, and
  the second threshold value is set such that a range of an angle of a face direction of the face image when the reliability of the face detection is greater than the second threshold value does not stretch over a third determination range which is a range of a predetermined angle with reference to the reference direction and a fourth determination range which is a range of a predetermined angle and is different from the third determination range.

4. A non-transitory storage medium storing a determination program causing a computer to execute a process comprising:
  receiving a face image of a user from a camera whose direction of optical axis is predetermined with respect to a reference direction;
  detecting a frontal face of the face image and determining a reliability of the detected frontal face;
  detecting a profile in the face image;
  determining a reliability of the detected profile;
  calculating a reliability of a face direction based on the reliability of the detected frontal face and the reliability of the detected profile;
  determining the face direction depending on whether or not the reliability of the face direction is greater than a first threshold value if the optical axis of the camera faces in a first direction;
  determining the face direction depending on whether or not the reliability of the face direction is greater than a second threshold value which is different from the first threshold value if the optical axis faces in a second direction which is different from the first direction; and
  outputting information for the determined face direction, wherein:
  the first threshold value is set such that a range of an angle of a face direction of the face image when the reliability of the face detection is greater than the first threshold value does not stretch over a first determination range which is a range of a predetermined angle with reference to the reference direction and a second determination range which is a range of a predetermined angle and is different from the first determination range, and
  the second threshold value is set such that a range of an angle of a face direction of the face image when the reliability of the face detection is greater than the second threshold value does not stretch over a third determination range which is a range of a predetermined angle with reference to the reference direction and a fourth determination range which is a range of a predetermined angle and is different from the third determination range.

* * * * *